(12) United States Patent
Gu et al.

(10) Patent No.: US 12,269,016 B2
(45) Date of Patent: Apr. 8, 2025

(54) RHODIUM-CONTAINING LAYERED CATALYST STRUCTURES AND METHODS OF MAKING THE SAME

(71) Applicant: GM GLOBAL TECHNOLOGY OPERATIONS LLC, Detroit, MI (US)

(72) Inventors: Yuntao Gu, Farmington Hills, MI (US); Gongshin Qi, Troy, MI (US); Jiazhi Hu, Troy, MI (US); Wei Li, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/749,894

(22) Filed: May 20, 2022

(65) Prior Publication Data

US 2023/0372909 A1   Nov. 23, 2023

(51) Int. Cl.
*B01J 23/63*   (2006.01)
*B01D 53/94*   (2006.01)
(Continued)

(52) U.S. Cl.
CPC ............ *B01J 23/63* (2013.01); *B01D 53/945* (2013.01); *B01J 21/04* (2013.01); *B01J 35/23* (2024.01);
(Continued)

(58) Field of Classification Search
CPC ........ B01J 23/63; B01J 21/04; B01J 35/0013; B01J 35/1014; B01J 35/1019; B01J 35/1038; B01J 35/1042; B01J 35/1047; B01J 37/0207; B01J 37/0213; B01J 37/0228; B01J 37/0236; B01J 37/0242; B01J 37/0244; B01D 53/945; B01D 2255/1025; B01D 2255/2065;
(Continued)

(56) References Cited

U.S. PATENT DOCUMENTS 8,663,588 B2 * 3/2014 Lindner .................. B01J 23/63
502/328
2020/0061595 A1   2/2020 Khivantsev et al.
(Continued)

FOREIGN PATENT DOCUMENTS

CN      117123219 A    11/2023
DE   102022127830 A1   11/2023

OTHER PUBLICATIONS

Duarte et al. (Oxidation State of Ce in CeO2-Promoted Rh/Al2O3 Catalysts during Methane Steam Reforming: H2O Activation and Alumina Stabilization, ACS Catalysis, 2013) (Year: 2013).*
(Continued)

*Primary Examiner* — Michael Forrest
*Assistant Examiner* — Logan Edward Laclair
(74) *Attorney, Agent, or Firm* — Harness, Dickey & Pierce, P.L.C.

(57) ABSTRACT

A layered catalyst structure for purifying an exhaust gas stream includes a catalyst support and a rhodium catalyst layer including an atomic dispersion of rhodium ions and/or rhodium atoms adsorbed on an exterior surface of the catalyst support. The catalyst support includes an alumina substrate, a first ceria layer disposed on and extending substantially continuously over the alumina substrate, and a second colloidal ceria layer formed directly on the first ceria layer over the alumina substrate.

19 Claims, 3 Drawing Sheets

(51) Int. Cl.
  *B01J 21/04*   (2006.01)
  *B01J 35/23*   (2024.01)
  *B01J 35/61*   (2024.01)
  *B01J 35/63*   (2024.01)
  *B01J 37/02*   (2006.01)
  *F01N 3/28*    (2006.01)

(52) U.S. Cl.
  CPC .......... *B01J 35/613* (2024.01); *B01J 35/615* (2024.01); *B01J 35/633* (2024.01); *B01J 35/635* (2024.01); *B01J 35/638* (2024.01); *B01J 37/0207* (2013.01); *B01J 37/0213* (2013.01); *B01J 37/0228* (2013.01); *B01J 37/0236* (2013.01); *B01J 37/0242* (2013.01); *B01J 37/0244* (2013.01); *F01N 3/2803* (2013.01); *F01N 3/2842* (2013.01); *B01D 2255/1025* (2013.01); *B01D 2255/2065* (2013.01); *B01D 2255/9025* (2013.01); *B01D 2255/9205* (2013.01); *B01D 2255/9207* (2013.01); *F01N 2370/02* (2013.01)

(58) Field of Classification Search
  CPC .... B01D 2255/9025; B01D 2255/9205; B01D 2255/9207; F01N 3/2803; F01N 3/2842; F01N 2370/02
  See application file for complete search history.

(56) References Cited

U.S. PATENT DOCUMENTS

| | | |
|---|---|---|
| 2021/0220812 A1 | 7/2021 | Liu et al. |
| 2023/0234035 A1 | 7/2023 | Gu et al. |
| 2023/0338928 A1 | 10/2023 | Gu et al. |

OTHER PUBLICATIONS

Khivantsev, Konstantin et al.; "Achieving Atomic Dispersion of Highly Loaded Transition Metals in Small-Pore Zeolite SSZ-13: Hight-Capacity and High-Efficiency Low-Temperature CO and Passive NOx Adsorbers"; Angewandte Chemie, International Edition 2018, 57; pp. 16672-16677.

Gu, Yuntao et al.; U.S. Appl. No. 17/581,447, filed Jan. 21, 2022, entitled "Layered Catalyst Structures and Methods of Making the Same"; 34 pages.

Gu, Yuntao et al.; U.S. Appl. No. 17/725,828, filed Apr. 21, 2022, entitled "Three-Way Catalyst With Reduced Palladium Loading and Method of Making the Three-Way Catalyst"; 33 pages.

* cited by examiner

RHODIUM-CONTAINING LAYERED CATALYST STRUCTURES AND METHODS OF MAKING THE SAME

INTRODUCTION

This section provides background information related to the present disclosure which is not necessarily prior art.

The present disclosure relates to catalysts for purifying exhaust gas streams from combustion processes and to methods of manufacturing layered catalyst structures including mixed metal oxide support materials loaded with rhodium catalysts.

Exhaust gases from combustion processes typically contain a variety of combustion reaction by-products, including unburned hydrocarbons (HC), carbon monoxide (CO), nitric oxide (NO), and nitrogen dioxide ($NO_2$), with NO and $NO_2$ collectively referred to as nitrogen oxides or $NO_x$. It may be desirable to reduce or control the emission of HC, CO, and/or $NO_x$ from various combustion processes into the ambient environment.

Exhaust gas treatment systems for internal combustion engines of automotive vehicles may include a so-called three-way catalyst (TWC) disposed in a path of an exhaust gas stream from the engine, which is designed to simultaneously convert HC, CO, and $NO_x$ in the exhaust gas stream to $CO_2$, $N_2$, and $H_2O$ prior to discharge. Such three-way catalysts oftentimes include one or more platinum group metal (PGM) elements (e.g., platinum, rhodium, palladium, et al.) supported on a thermally and mechanically stable, high surface area porous support material, which may comprise alumina ($Al_2O_3$).

SUMMARY

This section provides a general summary of the disclosure and is not a comprehensive disclosure of its full scope or all of its features.

A layered catalyst structure for purifying an exhaust gas stream is disclosed. The layered catalyst structure comprises a catalyst support and a rhodium catalyst layer. The catalyst support includes an alumina substrate, a first ceria layer disposed on and extending substantially continuously over the alumina substrate, and a second colloidal ceria layer formed directly on the first ceria layer over the alumina substrate. The rhodium catalyst layer includes an atomic dispersion of rhodium ions and/or rhodium atoms adsorbed on an exterior surface of the catalyst support.

The atomic dispersion of rhodium ions and/or rhodium atoms may be disposed on the exterior surface of the catalyst support at the location of surface defect sites in the second colloidal ceria layer.

The rhodium catalyst layer may be substantially free of Rh particles having diameters greater than or equal to about 1 nanometer and may be substantially free of clusters of Rh particles having diameters greater than or equal to about 1 nanometer.

After an oxidative treatment at a temperature of about 500° C. and after CO adsorption at a temperature of about 60° C., the layered catalyst structure may exhibit predominant peaks at wavenumbers of about 2101 $cm^{-1}$ and about 2031 $cm^{-1}$ using diffuse reflectance infrared Fourier transform spectroscopy.

After oxidative treatment at a temperature of about 500° C. and after CO adsorption at a temperature of about 60° C., the layered catalyst structure may not exhibit visually discernable peaks at wavenumbers of about 2070 $cm^{-1}$ or at about 1870 $cm^{-1}$ using diffuse reflectance infrared Fourier transform spectroscopy.

The rhodium catalyst layer may constitute, by weight, greater than or equal to about 0.1% to less than or equal to about 2% of the layered catalyst structure.

In aspects, the rhodium catalyst layer may constitute, by weight, greater than or equal to about 0.2% to less than or equal to about 1% of the layered catalyst structure.

The first ceria layer may have a BET surface area of greater than or equal to about 30 $m^2/g$ to less than or equal to about 150 $m^2/g$ and a pore volume of greater than or equal to about 0.2 mL/g to less than or equal to about 1.5 mL/g. The second colloidal ceria layer may have a BET surface area of greater than or equal to about 50 $m^2/g$ to less than or equal to about 180 $m^2/g$ and a pore volume of greater than or equal to about 0.2 mL/g to less than or equal to about 1.5 mL/g. The BET surface area of the second colloidal ceria layer may be greater than that of the first ceria layer.

Together, the first ceria layer and the second colloidal ceria layer may constitute, by weight, greater than or equal to about 5% to less than or equal to about 40% of the layered catalyst structure.

A method for removing hydrocarbon, carbon monoxide, and nitrogen oxides from an exhaust gas stream of a gasoline-powered internal combustion engine may comprise passing the exhaust gas stream over the layered catalyst structure.

A method of manufacturing a layered catalyst structure for purifying an exhaust gas stream is disclosed. In the method, a rhodium-containing precursor solution is applied to an exterior surface of a catalyst support. The catalyst support includes an alumina substrate, a first ceria layer disposed on and extending substantially continuously over the alumina substrate, and a second colloidal ceria layer deposited on the first ceria layer over the alumina substrate such that the exterior surface of the catalyst support is defined by the second colloidal ceria layer. The rhodium-containing precursor solution comprises positively charged rhodium ions or positively charged rhodium-containing complexes in an aqueous medium. The catalyst support and the rhodium-containing precursor solution are heated to evaporate the aqueous medium and form an atomic dispersion of rhodium ions on the exterior surface of the catalyst support.

When the rhodium-containing precursor solution is applied to the exterior surface of the catalyst support, a net negative charge may be imparted to the exterior surface of the catalyst support and the positively charged rhodium ions and/or the positively charged rhodium-containing complexes may electrostatically adsorb onto the exterior surface of the catalyst support.

The positively charged rhodium ions and/or the positively charged rhodium-containing complexes may electrostatically adsorb onto the exterior surface of the catalyst support at the location of surface defect sites in the second colloidal ceria layer.

The method may further comprise dissolving or dispersing a rhodium-containing compound in an aqueous solution to form the rhodium-containing precursor solution. The rhodium-containing compound may comprise rhodium nitrate, rhodium chloride, rhodium acetate, a rhodium amine complex, a rhodium hydrate complex, or a combination thereof.

The catalyst support may be impregnated with the rhodium-containing precursor solution using a wet impregnation technique or an incipient wetness impregnation technique.

The catalyst support and the rhodium-containing precursor solution may be heated in an oxygen $O_2$-containing environment at a temperature of greater than or equal to about 350 degrees Celsius to less than or equal to about 800 degrees Celsius.

Heating the catalyst support and the rhodium-containing precursor solution may release gases or vapors of nitrogen, nitrogen oxides, ammonia, chlorine, acetone, carbon dioxide, water, or a combination thereof.

The aqueous medium may comprise an aqueous ammonium hydroxide solution or a nitric acid solution.

The rhodium-containing precursor solution may have a pH of greater than or equal to about 5 to less than or equal to about 12.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
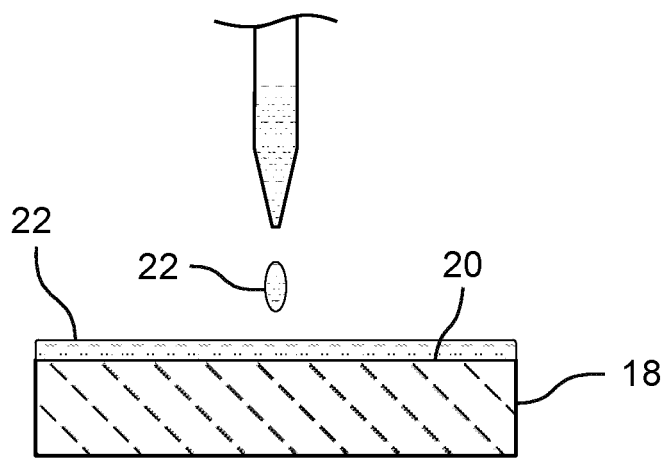
FIG. 1 is a schematic depiction of a step in a method of manufacturing a layered catalyst structure, wherein an $Al_2O_3$ substrate is impregnated with a Ce-containing precursor solution.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The present disclosure relates to rhodium (Rh)—, ceria ($CeO_2$)—, and alumina ($Al_2O_3$)-containing layered catalyst structures for purifying exhaust gas streams from combustion processes and to methods of manufacturing the $Rh/CeO_2/Al_2O_3$ layered catalyst structures. The layered catalyst structures comprise a catalyst support that includes an $Al_2O_3$ substrate, a first $CeO_2$ layer deposited on the $Al_2O_3$ substrate, and a second colloidal $CeO_2$ layer including a plurality of colloidal $CeO_2$ particles deposited on the $Al_2O_3$ substrate over the first $CeO_2$ layer. An atomic dispersion of rhodium (Rh) is formed as a catalyst layer on exposed surfaces of the high surface area colloidal $CeO_2$ particles.

In practice, the disclosed $Rh/CeO_2/Al_2O_3$ layered catalyst structures may help catalyze the conversion of unburned hydrocarbons (HC), carbon monoxide (CO), nitric oxide (NO), and nitrogen dioxide ($NO_2$) in exhaust gas streams from combustion processes to carbon dioxide ($CO_2$), nitrogen ($N_2$), and water ($H_2O$) prior to discharging the exhaust gas streams to the ambient environment. In addition, the disclosed $Rh/CeO_2/Al_2O_3$ layered catalyst structures may exhibit exceptional aging resistance, with the disclosed $Rh/CeO_2/Al_2O_3$ layered catalyst structures exhibiting relatively high catalytic activity even after aging, e.g., after the catalyst structures are subjected to a lean-rich cycling aging protocol.

Referring now to FIG. 1, a method of manufacturing a layered catalyst structure 10 (FIG. 7) may include a first stage in which a catalyst support 12 (FIG. 4) is prepared and a second stage in which a rhodium (Rh) catalyst layer 14 (FIG. 7) is deposited on surfaces 16 of the catalyst support 12 to form the layered catalyst structure 10. In the first stage, an alumina ($Al_2O_3$) substrate 18 defining an exterior surface 20 may be provided. The $Al_2O_3$ substrate 18 is porous and provides the layered catalyst structure 10 with exceptional thermal and mechanical stability. The $Al_2O_3$ substrate 18 may comprise an $Al_2O_3$ powder including a plurality of $Al_2O_3$ particles having a D50 particle diameter of greater than or equal to about 20 micrometers to less than or equal to about 70 micrometers. For example, the plurality of $Al_2O_3$ particles in the $Al_2O_3$ powder may have a D50 particle diameter of greater than or equal to about 40 micrometers to less than or equal to about 60 micrometers, or of about 50 micrometers. The $Al_2O_3$ substrate 18 may have a BET surface area of about 80 $m^2/g$ and a pore volume of about 0.6 mL/g.

As shown in FIG. 1, the $Al_2O_3$ substrate 18 may be impregnated with a cerium (Ce)-containing precursor solution 22 by applying the Ce-containing precursor solution 22 directly to the exterior surface 20 of the $Al_2O_3$ substrate 18. The Ce-containing precursor solution 22 may comprise a cerium salt dissolved or dispersed in an aqueous medium. The cerium salt may comprise a cation of cerium ($Ce^{3+}$) and a counterion (anion) of a nitrate ($NO_3^-$), sulphate ($SO_4^{2-}$), carbonate ($CO_3^{2-}$), citrate, halide (e.g., $F^-$ or $Cl^-$), alkoxide, phenoxide, acetates, benzoate, oxalate, acetylacetonate, and/or carboxylate. The aqueous medium may comprise water ($H_2O$). The amount of cerium in the Ce-containing precursor solution 22 may be selected to achieve a target cerium loading on the $Al_2O_3$ substrate 18. In aspects, the amount of cerium in the Ce-containing precursor solution 22 may constitute, by weight, greater than or equal to about 5% to less than or equal to about 30% of the Ce-containing precursor solution 22. For example, the Ce-containing precursor solution 22 may comprise cerium in an amount constituting, by weight, about 10% of the Ce-containing precursor solution 22. The $Al_2O_3$ substrate 18 may be impregnated with the Ce-containing precursor solution 22 using a dry or incipient wetness impregnation technique, wherein a volume of the Ce-containing precursor solution 22 applied to the $Al_2O_3$ substrate 18 is substantially equal to a calculated pore volume of the $Al_2O_3$ substrate 18.

Figure 2:
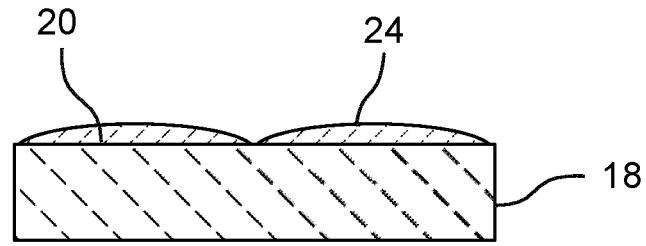
FIG. 2 is a schematic depiction of the $Al_2O_3$ substrate of FIG. 1 after the $Al_2O_3$ substrate and the Ce-containing precursor solution have been subjected to a first heat treatment to form a first $CeO_2$ layer on a surface of the $Al_2O_3$ substrate.

Referring now to FIG. 2, after the Ce-containing precursor solution 22 is applied to the exterior surface 20 of the $Al_2O_3$ substrate 18, the $Al_2O_3$ substrate 18 and the Ce-containing precursor solution 22 are subjected to a first heat treatment to remove the aqueous medium and the anion of the cerium salt (e.g., by evaporation), and to deposit a first $CeO_2$ layer 24 on the exterior surface 20 of the $Al_2O_3$ substrate 18. The first heat treatment may comprise heating the $Al_2O_3$ substrate 18 and the Ce-containing precursor solution 22 in an oxygen ($O_2$)-containing environment (e.g., air) at a temperature of greater than or equal to about 550° C. to less than or equal to about 1050° C. for a duration of greater than or equal to about one (1) hour to less than or equal to about 5 hours to form the first $CeO_2$ layer 24 on the exterior surface 20 of the $Al_2O_3$ substrate 18. In aspects, the first heat treatment may comprise heating the $Al_2O_3$ substrate 18 and the Ce-containing precursor solution 22 in an $O_2$-containing environment at a temperature of about 800° C. for a duration of about 2 hours to form the first $CeO_2$ layer 24 on the exterior surface 20 of the $Al_2O_3$ substrate 18.

The first $CeO_2$ layer 24 is porous and extends substantially continuously over the exterior surface 20 of the $Al_2O_3$ substrate 18. The first $CeO_2$ layer 24 may have a BET surface area of greater than or equal to about 30 $m^2/g$ to less than or equal to about 150 $m^2/g$ and a pore volume of greater than or equal to about 0.2 mL/g to less than or equal to about 1.5 mL/g. In aspects, the impregnation and heat treatment steps may be repeated to achieve a target $CeO_2$ loading on the $Al_2O_3$ substrate 18.

Figure 3:
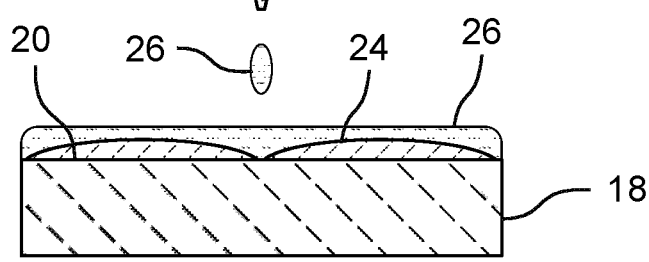
FIG. 3 is a schematic depiction of the $Al_2O_3$ substrate and the first $CeO_2$ layer of FIG. 2, wherein the first $CeO_2$ layer is impregnated with a Ce-containing colloidal suspension.

Referring now to FIG. 3, after formation of the first $CeO_2$ layer 24, the first $CeO_2$ layer 24 is impregnated with a cerium (Ce)-containing colloidal suspension 26, for example, by applying the Ce-containing colloidal suspension 26 directly onto the first $CeO_2$ layer 24, over the exterior surface 20 of the $Al_2O_3$ substrate 18. The Ce-containing colloidal suspension 26 may comprise a plurality of colloidal $CeO_2$ particles suspended in an aqueous medium. The colloidal $CeO_2$ particles may consist essentially of $CeO_2$ and have a D50 diameter of greater than or equal to about 5 nanometers to less than or equal to about 20 nanometers, or greater than or equal to about 10 nanometers to less than or equal to about 15 nanometers. The aqueous medium may comprise water ($H_2O$) and optionally an acid, e.g., acetic acid, which may help the colloidal $CeO_2$ particles remain suspended in the aqueous medium of the Ce-containing colloidal suspension 26. The amount of colloidal $CeO_2$ particles in the Ce-containing colloidal suspension 26 may be selected to achieve a target colloidal $CeO_2$ particle loading. In aspects, the colloidal $CeO_2$ particles may constitute, by weight, greater than or equal to about 10% to less than or equal to about 30% of the Ce-containing colloidal suspension 26. In aspects, the first $CeO_2$ layer 24 may be impregnated with the Ce-containing colloidal suspension 26 using a dry or incipient wetness impregnation technique, wherein the volume of the Ce-containing colloidal suspension 26 applied to the first $CeO_2$ layer 24 is substantially equal to a calculated pore volume of the first $CeO_2$ layer 24.

Figure 4:
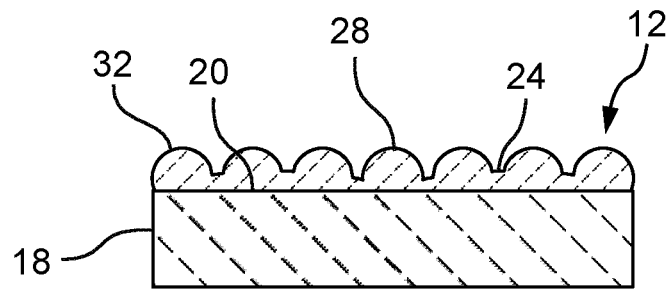
FIG. 4 is a schematic depiction of a catalyst support including the $Al_2O_3$ substrate and the first $CeO_2$ layer of FIG. 3, and a second colloidal $CeO_2$ layer formed on the $Al_2O_3$ substrate over the first $CeO_2$ layer by subjecting the $Al_2O_3$ substrate, the first $CeO_2$ layer, and the Ce-containing colloidal suspension of FIG. 3 to a second heat treatment.

Referring now to FIG. 4, the $Al_2O_3$ substrate 18, the first $CeO_2$ layer 24, and the Ce-containing colloidal suspension 26 are subjected to a second heat treatment to form a second colloidal $CeO_2$ layer 28 directly on the first $CeO_2$ layer 24. Together, the $Al_2O_3$ substrate 18, the first $CeO_2$ layer 24, and the second colloidal $CeO_2$ layer 28 make-up the catalyst support 12, with the second colloidal $CeO_2$ layer 28 defining an exterior surface 32 of the catalyst support 12. During the second heat treatment, the $Al_2O_3$ substrate 18, the first $CeO_2$ layer 24, and the Ce-containing colloidal suspension 26 are heated to remove the aqueous medium (e.g., by evaporation) and deposit the second colloidal $CeO_2$ layer 28 directly on the first $CeO_2$ layer 24 over the $Al_2O_3$ substrate 18. The second heat treatment may include heating the $Al_2O_3$ substrate 18, the first $CeO_2$ layer 24, and the Ce-containing colloidal suspension 26 in an oxygen $O_2$-containing environment (e.g., air) at a temperature of greater than or equal to about 350° C. to less than or equal to about 800° C. for a duration of greater than or equal to about one (1) hour to less than or equal to about 5 hours. In aspects, the second heat treatment may comprise heating the $Al_2O_3$ substrate 18, the first $CeO_2$ layer 24, and the Ce-containing colloidal suspension 26 in an $O_2$-containing environment at a temperature of about 550° C. for a duration of about 2 hours to form the second colloidal $CeO_2$ layer 28 on the $Al_2O_3$ substrate 18.

The second colloidal $CeO_2$ layer 28 is porous and may be chemically and mechanically bonded to the first $CeO_2$ layer 24, for example, via lattice matching. The second colloidal $CeO_2$ layer 28 may consist essentially of $CeO_2$ and may have a BET surface area in a range of from about 50 $m^2/g$ to about 180 $m^2/g$ and a pore volume in a range of from about 0.2 mL/g to about 1.5 mL/g. In aspects, the impregnation and heat treatment steps may be repeated one or more times to achieve a target colloidal $CeO_2$ particle loading on the $Al_2O_3$ substrate 18.

The first $CeO_2$ layer 24 may help the second colloidal $CeO_2$ layer 28 adhere to the surface 20 of the $Al_2O_3$ substrate 18 and may extend substantially continuously over the surface 20 of the $Al_2O_3$ substrate 18. The second colloidal $CeO_2$ layer 28 may be formed on the $Al_2O_3$ substrate 18 over the first $CeO_2$ layer 24 and may provide the catalyst support 12 with a relatively high number of surface defects sites. Defects sites on the exterior surface 32 of the catalyst support 12 may occur, for example, at the locations of oxygen vacancies, interstitial atoms, lattice substitutions, dislocations, grain boundaries, or impurities in the second colloidal $CeO_2$ layer 28. Without intending to be bound by theory, it is believed that the relatively high surface area and high pore volume of the second colloidal $CeO_2$ layer 28, as compared to that of the first $CeO_2$ layer 24, may provide the second colloidal $CeO_2$ layer 28 with a relatively high surface defect density, as compared to that of the first $CeO_2$ layer 24. In addition, it is believed that the most chemically reactive sites on the surface of a metal oxide occur at the location of surface defect sites. Therefore, formation of the second colloidal $CeO_2$ layer 28 on the $Al_2O_3$ substrate 18 over the first $CeO_2$ layer 24 may increase the surface defect density of the catalyst support 12 and may provide the layered catalyst structure 10 with improved catalytic activity.

Figure 5:
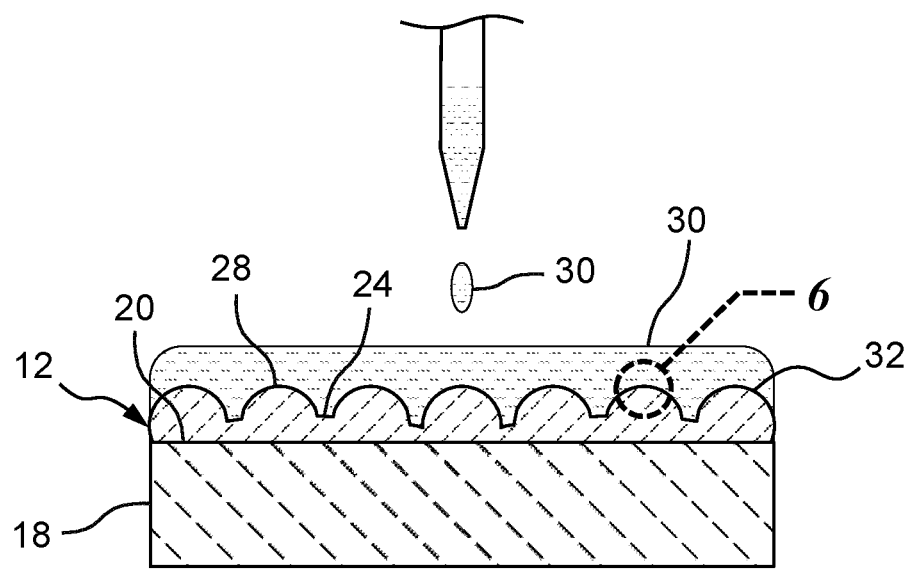
FIG. 5 is a schematic depiction of the catalyst support of FIG. 4, wherein the second colloidal $CeO_2$ layer of the catalyst support is impregnated with a Rh-containing precursor solution.

Referring now to FIG. 5, after formation of the second colloidal $CeO_2$ layer 28, a rhodium (Rh)-containing precursor solution 30 is applied to the exterior surface 32 of the catalyst support 12 such that the Rh-containing precursor solution 30 at least partially impregnates the catalyst support 12 by infiltrating the pores thereof. As shown in FIG. 5, the Rh-containing precursor solution 30 may be applied directly to the surface 32 of the catalyst support 12 such that the Rh-containing precursor solution 30 wets the surfaces of the second colloidal $CeO_2$ layer 28 and infiltrates the pores thereof. The Rh-containing precursor solution 30 may comprise rhodium or a rhodium-containing compound dissolved or dispersed in an aqueous medium. Examples of rhodium-containing compounds include rhodium salts, e.g., rhodium (III) nitrate, $Rh(NO_3)_3$; rhodium(III) chloride, $RhCl_3$; rhodium(II) acetate, $Rh_2(OOCCH_3)_4$; and/or rhodium(III) sulfate, $Rh_2(SO_4)_3$ and rhodium amine complexes, e.g., rhodium(III) pentaamine trinitrate, $[Rh(NH_3)_5](NO_3)_3$; pentaamminechlororhodium dichloride, $[RhCl(NH_3)_5](Cl)_2$; rhodium(III) pentaamminechloro sulfate, $[RhCl(NH_3)_5]SO_4$; and/or pentaammine(nitrito-n)rhodium dinitrate, $[Rh(NH_3)_5](NO_2)(NO_3)_2$. In aspects, the rhodium compound may be provided in the form of a hydrate complex, e.g., rhodium(III) nitrate dihydrate $(Rh(NO_3)_3 \cdot (H_2O)_n]$ and/or rhodium(III) chloride hydrate $[RhCl_3 \cdot (H_2O)_n]$, where n is an integer in the range of 1 to 3.

The Rh-containing precursor solution 30 may be prepared by dissolving or dispersing rhodium or a rhodium-containing compound in an aqueous medium. In some aspects, the aqueous medium may comprise or consist essentially of water ($H_2O$). In some aspects, the aqueous medium may comprise an aqueous nitric acid solution ($HNO_3$) or an aqueous ammonium hydroxide ($NH_4OH$) solution. The Rh-containing precursor solution 30 may be formulated to exhibit a pH in a range of from about 5 to about 12 at a temperature of about 25° C. In the Rh-containing precursor solution 30, rhodium may be present in the form of positively charged $Rh^{3+}$ cations and/or positively charged Rh-containing complexes balanced by anions, e.g., of $NO_3^-$, $Cl^-$, $CH_3COO^-$, and/or $SO_4^{2-}$. Examples of positively charged Rh-containing complexes include $[Rh(NH_3)_5]^{3+}$, $[RhCl(NH_3)_5]^{2+}$, and/or $[Rh(NH_3)_6]^{3+}$. The amount of rhodium in the Rh-containing precursor solution 30 may be selected to provide the layered catalyst structure 10 with a target Rh loading.

Figure 6:
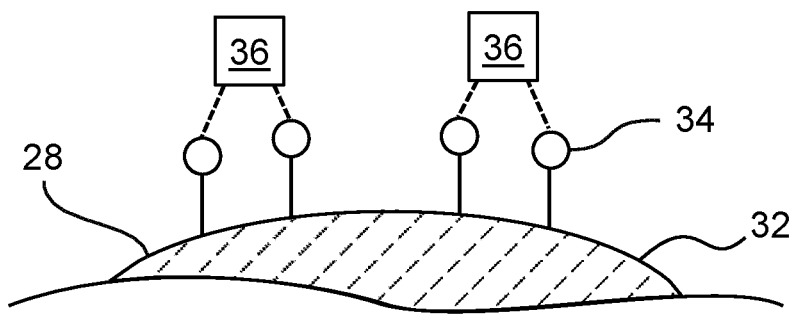
FIG. 6 is an enlarged view of a surface of the second colloidal $CeO_2$ layer of FIG. 5 depicting electrostatic interactions between negatively charged —$O^-$ groups (shown as circles, ○) on the surface of the second colloidal $CeO_2$ layer and positively charged $Rh^{3+}$ ions or Rh-containing complexes (shown as squares, □) in the Rh-containing precursor solution during impregnation.

The Rh-containing precursor solution 30 is formulated to promote the adsorption of isolated $Rh^{3+}$ ions on the exterior surface 32 of the catalyst support 12. As shown in FIG. 6, when the Rh-containing precursor solution 30 is applied to the surface 32 of the catalyst support 12, functional groups on the surface of the second colloidal $CeO_2$ layer 28 will be deprotonated and converted to negatively charged species 34 (shown as circles, ○), creating a net negative charge on the surface 32 of the catalyst support 12. In aspects, the functional groups on the surface 32 of the catalyst support 12 may comprise hydroxyl groups (—OH), and the hydroxyl functional groups may be deprotonated and converted to negatively charged —$O^-$ species on the surface 32 of the catalyst support 12. Without intending to be bound by theory, it is believed that the positively charged $Rh^{3+}$ ions (and/or the positively charged Rh-containing complexes) 36 (shown as squares, □) in the Rh-containing precursor solution 30 will be coulombically attracted to the negatively charged species 34 on the surface of the second colloidal $CeO_2$ layer 28 and will electrostatically adsorb onto the surface 32 of the catalyst support 12 at the locations of the negatively charged species 34. Without intending to be bound by theory, it is believed that deprotonation of the functional groups and formation of the negatively charged species 34 may be favored at the location of surface defect sites in the second colloidal $CeO_2$ layer 28.

The catalyst support 12 may be impregnated with the Rh-containing precursor solution 30 using a wet impregnation technique or a dry or incipient wetness impregnation technique. If a wet impregnation technique is used, the volume of the Rh-containing precursor solution 30 applied to the surface 32 of the catalyst support 12 will be greater than a calculated pore volume of the catalyst support 12. If a dry or incipient wetness impregnation technique is used, the volume of the Rh-containing precursor solution 30 applied to the surface 32 of the catalyst support 12 will be substantially equal to a calculated pore volume of the catalyst support 12.

Figure 7:
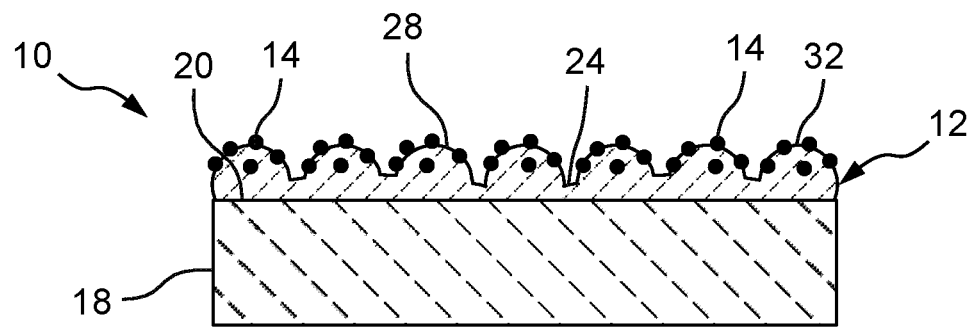
FIG. 7 is a schematic depiction of a layered catalyst structure including the catalyst support of FIG. 5, and an Rh catalyst layer formed directly on the surface of the second colloidal $CeO_2$ layer of the catalyst support by subjecting the catalyst support and the Rh-containing precursor solution of FIG. 5 to a third heat treatment.

Referring now to FIG. 7, the catalyst support 12 and the Rh-containing precursor solution 30 are subjected to a third heat treatment to deposit the Rh catalyst layer 14 directly on the surface 32 of the catalyst support 12 (i.e., directly on the surface of the second colloidal $CeO_2$ layer 28) and form the layered catalyst structure 10. During the third heat treatment, the catalyst support 12 and the Rh-containing precursor solution 30 may be heated to remove the aqueous medium, the negatively charged anions, e.g., $NO_3^-$, $Cl^-$, $CH_3COO^-$, and/or $SO_4^{2-}$, and reaction byproducts from the catalyst support 12 (e.g., by evaporation), and deposit the Rh catalyst layer 14 directly on the surface 32 of the catalyst support 12. In aspects where rhodium is present in the Rh-containing precursor solution 30 in the form of positively charged Rh-containing complexes, the catalyst support 12 and the Rh-containing precursor solution 30 may be heated to decompose the positively charged Rh-containing complexes. Chemical compounds that may be released in gas or vapor form from the catalyst support 12 and the Rh-containing precursor solution 30 during the third heat treatment may include nitrogen ($N_2$), nitrogen oxides (e.g., $N_2O$, $NO_2$, and/or NO), ammonia ($NH_3$), chlorine ($Cl_2$), acetone, carbon dioxide ($CO_2$), sulfur dioxide ($SO_2$), and/or $H_2O$.

The third heat treatment may include heating the catalyst support 12 and the Rh-containing precursor solution 30 in an oxygen $O_2$-containing environment (e.g., air) at a temperature of greater than or equal to about 350° C. to less than or equal to about 800° C. for a duration of greater than or equal to about one (1) hour to less than or equal to about 5 hours. In aspects, the third heat treatment may comprise heating the catalyst support 12 and the Rh-containing precursor solution 30 in an $O_2$-containing environment at a temperature of about 500° C. for a duration of about 2 hours to form the Rh catalyst layer 14 directly on the surface 32 of the catalyst support 12.

The Rh catalyst layer 14 may comprise an atomic dispersion of $Rh^{3+}$ ions, Rh atoms, and optionally a plurality of sub-nanometer sized Rh particles deposited directly on the surface 32 of the catalyst support 12 (i.e., on the surface of the second colloidal $CeO_2$ layer 28). Without intending to be bound by theory, it is believed that coulombic forces between the positively charged $Rh^{3+}$ ions (and/or the positively charged Rh-containing complexes) 36 in the Rh-containing precursor solution 30 and the negatively charged species 34 on the catalyst support 12 may help anchor the $Rh^{3+}$ ions 36 to the surface 32 of the catalyst support 12 at the specific locations of the negatively charged species 34, e.g., at the specific location of surface defect sites in the second colloidal $CeO_2$ layer 28. And, during the third heat treatment, these strong electrostatic interactions may inhibit migration of the $Rh^{3+}$ ions (and/or the positively charged Rh-containing complexes) 36 on the surface 32 of the catalyst support 12, which may, in turn, promote the deposition of isolated $Rh^{3+}$ ions and/or Rh atoms on the catalyst support 12, instead of the formation and/or agglomeration of relatively large Rh particles, Rh particle clusters, and/or RhO particles. In aspects, when present, sub-nanometer sized Rh particles in the Rh catalyst layer 14 may have a D50 particle diameter of less than or equal to about one (1) nanometer.

The Rh catalyst layer 14 may consist essentially of rhodium. The Rh catalyst layer 14 constitute, by weight, greater than or equal to about 0.1% or about 0.2%, less than or equal to about 2.0% or about 1.5%, or between about 0.1% to about 2.0% or between about 0.2% to about 1.5% of the layered catalyst structure 10. In some aspects, the Rh catalyst layer 14 may constitute, by weight, about 0.5% or about 1.0% of the layered catalyst structure 10.

The second colloidal $CeO_2$ layer 28 and the first $CeO_2$ layer 24 may consist essentially of $CeO_2$ and, together, the second colloidal $CeO_2$ layer 28 and the first $CeO_2$ layer 24 may constitute, by weight, greater than or equal to about 5% to less than or equal to about 40% of the layered catalyst structure 10. For example, the second colloidal $CeO_2$ layer 28 and the first $CeO_2$ layer 24 may constitute, by weight, about 30% of the layered catalyst structure 10.

The layered catalyst structure 10 may be a substantially spherical particle having a diameter of greater than or equal to 200 micrometers to less than or equal to 500 micrometers. A plurality of the layered catalyst structures 10 may be positioned in a path of an exhaust gas stream from a combustion process to help catalyze the conversion of unburned hydrocarbons (HC), carbon monoxide (CO), nitric oxide (NO), and nitrogen dioxide ($NO_2$) in the exhaust gas stream to carbon dioxide ($CO_2$), nitrogen ($N_2$), and water ($H_2O$). A plurality of the layered catalyst structures 10 may be positioned in the path of an exhaust gas stream, for example, by filling a tube or passageway with a packed volume of the layered catalyst structures 10 or by depositing the layered catalyst structures 10 in the form of a slurry on wall surfaces of a flow-through monolithic substrate. Prior to positioning a plurality of the layered catalyst structures 10 in the path of an exhaust gas stream, the layered catalyst structures 10 may be sieved so that, in practice, the layered catalyst structures 10 exhibit a D50 particle diameter in a range of from about 245 micrometers to about 450 micrometers.

The HC, CO, and NO conversion efficiency of the layered catalyst structure 10 may be evaluated by exposing a volume of the layered catalyst structures 10 to a simulated exhaust gas stream including CO, NO, $C_3H_6$, and $C_3H_8$. The simulated exhaust gas flow may be heated from an initial temperature of 100° C. to a temperature of 450° C. to determine the HC, CO, and NO conversion efficiency of the layered catalyst structure 10 over a range of temperatures. The term "T50" refers to the temperature at which the layered catalyst structure 10 achieved 50% conversion efficiency. After initial formation of the layered catalyst structure 10, the layered catalyst structure 10 may have a T50 for CO oxidation of about 242° C., a T50 for NO reduction of about 328° C., and a T50 for $C_3H_6$ oxidation of about 335° C.

The layered catalyst structure 10 may exhibit exceptionally high catalytic activity, even after the layered catalyst structure 10 is subjected to a simulated gasoline engine exhaust gas stream using a lean-rich cycling aging protocol, wherein the composition of the simulated exhaust gas stream is repeatedly cycled between fuel-lean and fuel-rich simulated engine exhaust conditions. Such lean-rich cycling aging protocols may be performed at temperatures greater than about 450° C. for durations greater than 20 minutes. After the layered catalyst structure 10 is subjected to a lean-rich cycling aging protocol, the layered catalyst structure 10 may have a T50 for CO oxidation of about 338° C., a T50 for NO reduction of about 343° C., and a T50 for $C_3H_6$ oxidation of about 375° C.

The formation of isolated $Rh^{3+}$ ions on the surface of the second colloidal $CeO_2$ layer 28 of the layered catalyst structure 10 may be confirmed and/or substantiated using diffuse reflectance infrared Fourier transform spectroscopy (DRIFTS). Prior to performing DRIFTS, a volume of the layered catalyst structures 10 may be exposed to an oxidizing feed comprising 10 vol. % $O_2$ in an inert carrier gas at a temperature of about 500° C. Thereafter, a DRIFTS spectrum of CO adsorption may be obtained by exposing a volume of the layered catalyst structures 10 to a feed of 1000 ppm CO in an inert carrier gas at a temperature of about 60° C.

Figure 8:
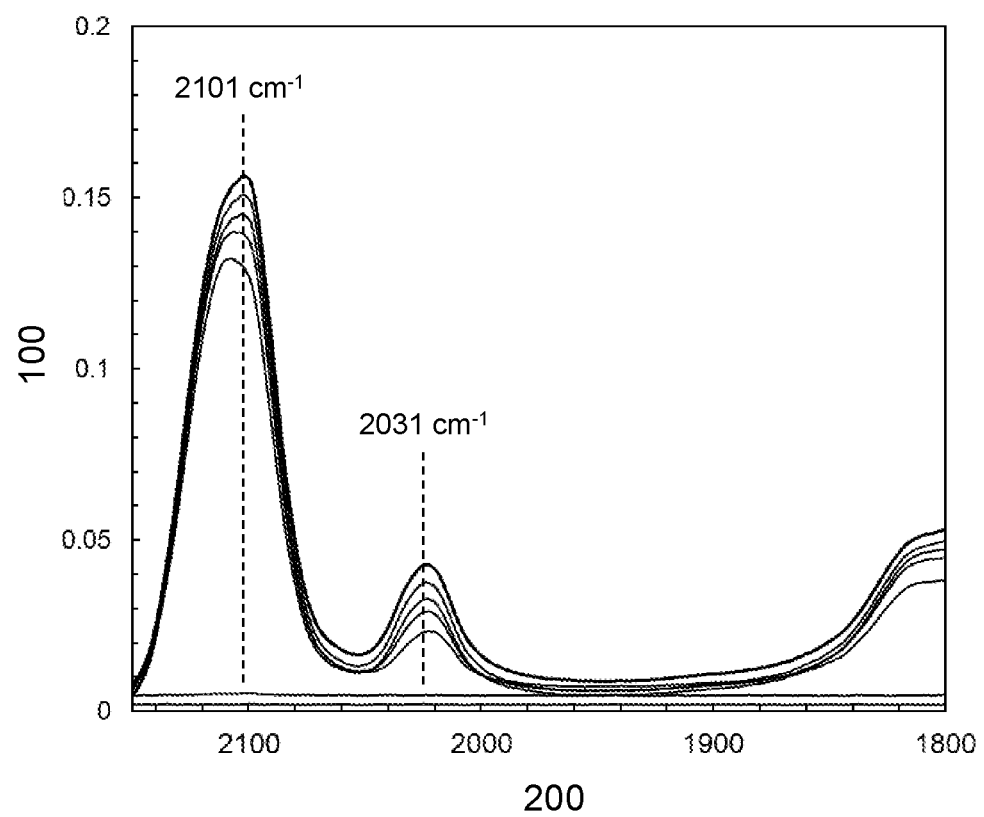
FIG. 8 depicts a spectrum of Absorbance (a.u.) vs. Wavenumber ($cm^{-1}$) obtained from measurements of CO adsorption on a volume of the layered catalyst structures of FIG. 7 collected using diffuse reflectance infrared Fourier transform spectroscopy (DRIFTS).

As shown in FIG. 8, a DRIFTS spectrum of Absorbance (a.u.) 100 vs. Wavenumber ($cm^{-1}$) 200 obtained from measurements of CO adsorption collected over a volume of the layered catalyst structures 10 depicts predominant bands at about 2101 $cm^{-1}$ and about 2031 $cm^{-1}$. For example, as shown in FIG. 8, a DRIFTS spectrum of CO adsorption collected over a volume of the layered catalyst structures 10 may depict a first predominant bands in the range of less than or equal to about 2111 $cm^{-1}$ or about 2106 $cm^{-1}$, greater than or equal to about 2091 $cm^{-1}$ or about 2096 $cm^{-1}$, or between about 2111 $cm^{-1}$ to about 2091 $cm^{-1}$ or between about 2106 $cm^{-1}$ to about 2096 $cm^{-1}$. In addition, a DRIFTS spectrum of CO adsorption collected over a volume of the layered catalyst structures 10 may depict a second predominant band in the range of less than or equal to about 2041 $cm^{-1}$ or about 2036 $cm^{-1}$, greater than or equal to about 2021 $cm^{-1}$ or about 2026 $cm^{-1}$, or between about 2041 $cm^{-1}$ to about 2021 $cm^{-1}$ or between about 2036 $cm^{-1}$ to about 2026 $cm^{-1}$. The presence of predominant bands at about 2101 $cm^{-1}$ and about 2031 $cm^{-1}$ is indicative of carbonyls adsorbed on isolated $Rh^{3-}$ ions on the surface of the second colloidal $CeO_2$ layer 28 of the layered catalyst structure 10. Notably, the DRIFTS spectrum shown in FIG. 8 does not depict predominant or visually discernable bands at about 2070 $cm^{-1}$ or at about 1870 $cm^{-1}$. A predominant band at about 2070 $cm^{-1}$ would indicate the presence of clusters of nanometer-sized Rh particles and a predominant band at about 1870 $cm^{-1}$ would indicate the presence of Rh nanoparticles having diameters greater than or equal to about 3 nanometers on the surface of the second colloidal $CeO_2$ layer 28 of the layered catalyst structure 10. In practice, the deposition of isolated $Rh^{3+}$ ions on the surface of the second colloidal $CeO_2$ layer 28 is favored over the formation of Rh nanoparticles and Rh nanoparticle clusters. Without intending to be bound by theory, it is believed that the formation of isolated $Rh^{3+}$ ions increases the catalytic activity of the layered catalyst structure 10 without increasing the Rh loading (i.e., the weight fraction of the Rh catalyst layer 14). In addition, it is believed that the formation of isolated $Rh^{3+}$ ions increases the number of $Rh^{3+}$ ions and/or Rh atoms that are exposed to the exhaust gas stream, as compared to the number of Rh atoms that would be exposed to the exhaust gas stream if the Rh catalyst layer 14 included Rh nanoparticles and Rh nanoparticle clusters. In the presently disclosed layered catalyst structures 10, isolated $Rh^{3+}$ ions and/or isolated Rh atoms may account for, by weight, greater than or equal to about 80% or about 90% of the Rh catalyst layer 14. At the same time, the Rh catalyst layer 14 may be substantially free of Rh nanoparticles having diameters greater than or equal to about 3 nanometers and may be substantially free of clusters of nanometer-sized Rh particles.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A layered catalyst structure for purifying an exhaust gas stream, the layered catalyst structure comprising:
   a catalyst support including
      a porous alumina substrate,
      a porous ceria layer formed on and extending over at least one surface of the alumina substrate, the porous ceria layer consisting of $CeO_2$, and
      a porous colloidal ceria layer formed on the porous ceria layer, the porous colloidal ceria layer consisting of $CeO_2$; and
   a rhodium catalyst layer consisting of rhodium formed on an exterior surface of the catalyst support.

2. The layered catalyst structure of claim 1, wherein the rhodium of the rhodium catalyst layer is disposed on the exterior surface of the catalyst support at the location of surface defect sites in the porous colloidal ceria layer.

3. The layered catalyst structure of claim 1, wherein the rhodium catalyst layer is substantially free of rhodium particles having diameters greater than or equal to about 1 nanometer and is substantially free of clusters of rhodium particles having diameters greater than or equal to about 1 nanometer.

4. The layered catalyst structure of claim 1, wherein after oxidative treatment at a temperature of about 500° C. and after carbon monoxide adsorption at a temperature of about 60° C., the layered catalyst structure exhibits predominant peaks at wavenumbers of about 2101 $cm^{-1}$ and about 2031 $cm^{-1}$ using diffuse reflectance infrared Fourier transform spectroscopy.

5. The layered catalyst structure of claim 1, wherein after oxidative treatment at a temperature of about 500° C. and after carbon monoxide adsorption at a temperature of about 60° C., the layered catalyst structure does not exhibit visually discernable peaks at wavenumbers 2070 $cm^{-1}$ or at 1870 $cm^{-1}$ using diffuse reflectance infrared Fourier transform spectroscopy.

6. The layered catalyst structure of claim 1, wherein the rhodium catalyst layer constitutes, by weight, greater than or equal to about 0.1% to less than or equal to about 2% of the layered catalyst structure.

7. The layered catalyst structure of claim 1, wherein the rhodium catalyst layer constitutes, by weight, greater than or equal to about 0.2% to less than or equal to about 1% of the layered catalyst structure.

8. The layered catalyst structure of claim 1, wherein
   the porous ceria layer has a BET surface area of greater than or equal to about 30 $m^2/g$ to less than or equal to about 150 $m^2/g$ and a pore volume of greater than or equal to about 0.2 mL/g to less than or equal to about 1.5 mL/g,
   the porous colloidal ceria layer has a BET surface area of greater than or equal to about 50 $m^2/g$ to less than or equal to about 180 $m^2/g$ and a pore volume of greater than or equal to about 0.2 mL/g to less than or equal to about 1.5 mL/g, and
   the BET surface area of the porous colloidal ceria layer is greater than that of the porous ceria layer.

9. The layered catalyst structure of claim 1, wherein, together, the porous ceria layer and the porous colloidal ceria layer constitute, by weight, greater than or equal to about 5% to less than or equal to about 40% of the layered catalyst structure.

10. The layered catalyst structure of claim 1, wherein a method for forming the layered catalyst structure comprises:
   obtaining the catalyst support;
   contacting a rhodium-containing precursor solution to the exterior surface of the catalyst support, the rhodium-containing precursor solution including positively charged rhodium ions or positively charged rhodium-containing complexes in an aqueous medium; and
   heating the catalyst support and the rhodium-containing precursor solution to evaporate the aqueous medium and form the rhodium catalyst layer.

11. A method of manufacturing the layered catalyst structure of claim 1 for purifying an exhaust gas stream, the method comprising the following steps
   (a) applying a rhodium-containing precursor solution to an exterior surface of a catalyst support, the catalyst support including an alumina substrate, a porous ceria layer formed on the alumina substrate and consisting of $CeO_2$, and a porous colloidal ceria layer formed on the porous ceria layer over the alumina substrate and consisting of $CeO_2$, the exterior surface of the catalyst support being defined by the porous colloidal ceria layer, wherein the rhodium-containing precursor solution comprises positively charged rhodium ions or positively charged rhodium-containing complexes in an aqueous medium; and
   (b) heating the catalyst support and the rhodium-containing precursor solution to evaporate the aqueous medium and form an atomic dispersion of rhodium ions on the exterior surface of the catalyst support.

12. The method of claim 11, wherein, when the rhodium-containing precursor solution is applied to the exterior surface of the catalyst support in step (a), a net negative charge is imparted to the exterior surface of the catalyst support and the positively charged rhodium ions and/or the positively charged rhodium-containing complexes electrostatically adsorb onto the exterior surface of the catalyst support.

13. The method of claim 12, wherein the positively charged rhodium ions and/or the positively charged rhodium-containing complexes electrostatically adsorb onto the exterior surface of the catalyst support at the location of surface defect sites in the porous colloidal ceria layer.

14. The method of claim 11, further comprising:
   dissolving or dispersing a rhodium-containing compound in an aqueous solution to form the rhodium-containing precursor solution of step (a),
   wherein the rhodium-containing compound comprises rhodium nitrate, rhodium chloride, rhodium acetate, a rhodium amine complex, a rhodium hydrate complex, or a combination thereof.

15. The method of claim 11, wherein the catalyst support and the rhodium-containing precursor solution are heated in step (b) in an oxygen-containing environment at a temperature of greater than or equal to about 350 degrees Celsius to less than or equal to about 800 degrees Celsius.

16. The method of claim 11, wherein heating the catalyst support and the rhodium-containing precursor solution in step (b) releases gases or vapors of nitrogen, nitrogen oxides, ammonia, chlorine, acetone, carbon dioxide, water, or a combination thereof.

17. The method of claim 11, wherein the aqueous medium comprises an aqueous ammonium hydroxide solution or a nitric acid solution.

18. The method of claim 11, wherein the rhodium-containing precursor solution has a pH of greater than or equal to about 5 to less than or equal to about 12.

19. A method for removing hydrocarbon, carbon monoxide, and nitrogen oxides from an exhaust gas stream of a gasoline-powered internal combustion engine, the method comprising passing the exhaust gas stream over the layered catalyst structure of claim 1.

\* \* \* \* \*